Patented Dec. 8, 1925.

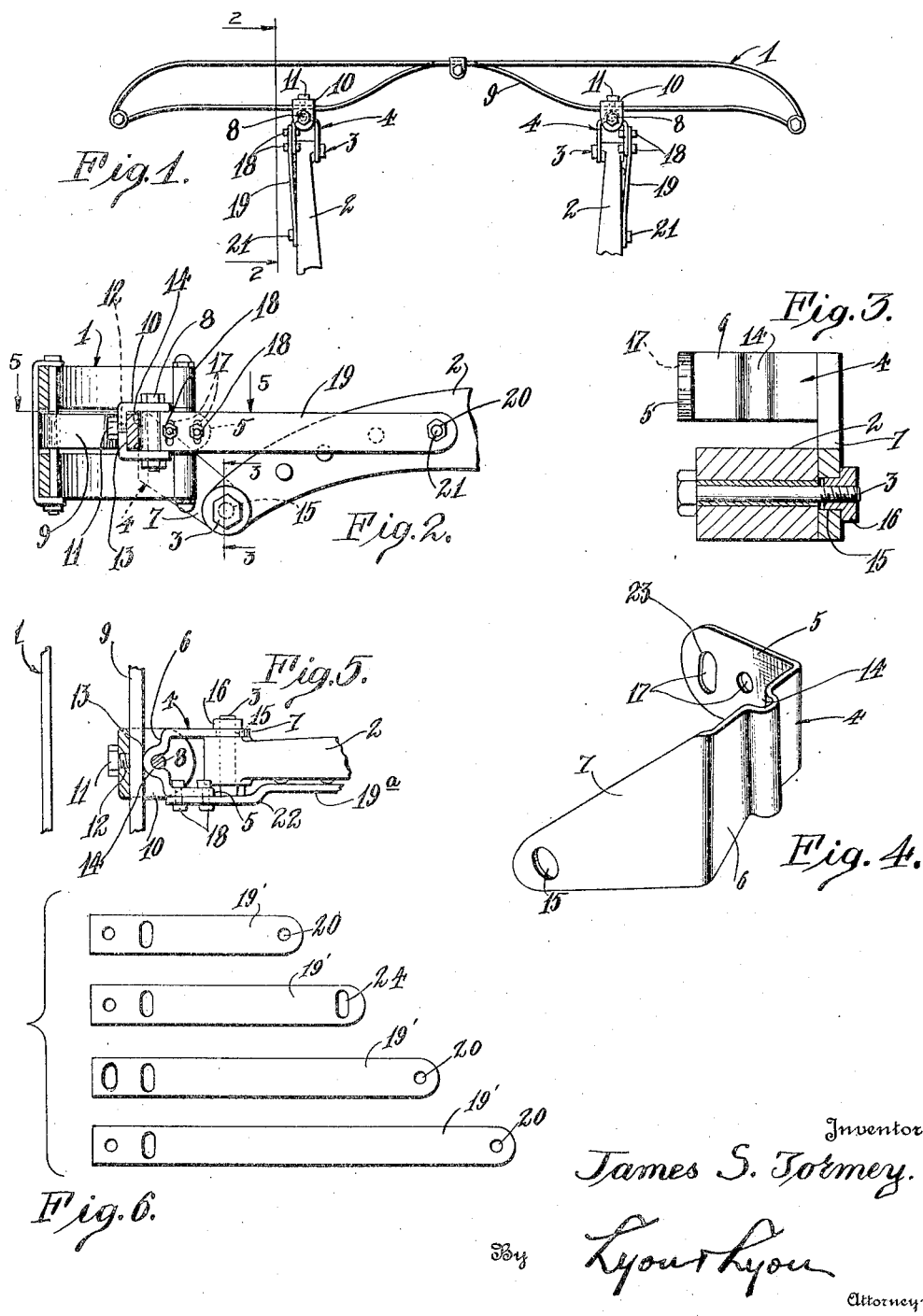

1,564,646

UNITED STATES PATENT OFFICE.

JAMES S. TORMEY, OF LOS ANGELES, CALIFORNIA, ASSIGNOR TO UNITED STATES BUMPER COMPANY, INC., OF LOS ANGELES, CALIFORNIA, A CORPORATION OF CALIFORNIA.

BUMPER BRACKET.

Application filed June 30, 1925. Serial No. 40,635.

*To all whom it may concern:*

Be it known that I, JAMES S. TORMEY, a citizen of the United States, residing at Los Angeles, in the county of Los Angeles and State of California, have invented a new and useful Bumper Bracket, of which the following is a specification.

This invention relates to a bracket for mounting or securing a bumper to the frame of a motor vehicle. Many forms of brackets are now constructed and are in use for mounting bumpers to the frames of vehicles. However, these bumpers are, for the most part, limited in their applicability to the particular type or types of motor vehicles for which they are designed and their use is, therefore, restricted and it is necessary for a dealer who wishes to install bumpers to carry a large supply of supporting or mounting brackets which greatly increases the cost in that he is required to carry a large stock of such brackets many of which are often never employed or used, as the manufacturers of the particular vehicle for which the same were designed change the design of the vehicle so that the particular brackets are no longer useful.

It is, therefore, an object of this invention to provide a bumper bracket that may be used for the installation of bumpers on practically all types of motor vehicles and which is so constructed that it is not necessary to form a hole or holes in the frame of the motor vehicle, this object rather being accomplished by the carrying of a supply of attaching arms of simple construction and adapted for use in mounting the bumper bracket proper to the frame of the vehicle at the point or points wherein the hole or holes are normally bored by the manufacturer of the motor vehicle to accommodate shock absorbers and like accessory equipment.

Another object of this invention is to provide a simple and inexpensive form of bracket that is easily installed and which is extremely well adapted to carry out the above enumerated objects.

Other objects and advantages of this invention will be apparent from the following detailed description of the preferred embodiment thereof as illustrated in the accompanying drawings.

In the drawings:

Fig. 1 is a top plan view of a bumper illustrating the same as attached to a portion of a motor vehicle frame by brackets embodying this invention.

Fig. 2 is a sectional end elevation thereof taken substantially on the line 2—2 of Fig. 1.

Fig. 3 is a rear elevation taken substantially on the line 3—3 of Fig. 2.

Fig. 4 is a perspective view of a bumper bracket embodying this invention.

Fig. 5 is an enlarged top plan view partly in section of a bracket embodying this invention.

Fig. 6 is a side elevation of a number of supporting arms for use in connection with the bumper bracket embodying this invention.

In the preferred embodiment of this invention, 1 illustrates a bumper which may be of any desired or preferred form, and 2 illustrates the forward section or horns of a motor vehicle frame from which a spring, not shown, is usually supported at the pin 3.

4 illustrates the body of the bumper bracket which comprises an arm 5, a transversely extending section 6 and an inclined arm 7, the transversely extending section 6 being formed with a chamber 14 adapted to accommodate a bolt 8. The rearward bar 9 of the bumper 1 is secured to the body of the bracket by means of a U-clamp 10 which is adapted to receive the bolt 8 and in which a set screw or bolt 11 is screw threaded as illustrated at 12.

The bar of the bumper 9 extends between the U-shaped member 10 and the outer surface of the transverse portion 6 of the bracket body 4. When the set screw 11 is tightened the bar 9 is forced against the surface 13 of the transversely extending portion 6 of the body of the bracket 4 and the arms of the U member 10 exert a pressure upon the bolt 8 which maintains the same in position in the chamber 14. The inclined arm 7 is provided with a bore 15 which is adapted to fit over the pin 3 or to be maintained in position on the pin 3 by means of a cap nut 16 which is screw threaded to the pin 3. The arm 5 of the body 4 of the bracket is provided with a pair of holes 17 adapted to receive bolts 18.

An arm 19 is maintained in engagement with the arm 5 by means of the bolts 18 and extends rearwardly from the bolts 18 to engage the frame member 2 of the vehicle frame. The arm 19 is provided with a bore 20 at its rearward end which is adapted to receive the bolt 21 which bolt 21 passes through the bore formed in the frame member 2 formed therein by the manufacturer of the motor vehicle to accommodate a shock absorber or like accessory.

In many cases it may be advisable to employ an offset arm $19^a$ as illustrated at 22 in Fig. 5. Either one of the holes 17 may be slotted as illustrated at 23 or both of the holes 17 may be so slotted. It may also be advisable, in many cases, to slot the rearward end of the bar 19 as illustrated at 24 so that a great range of adjustability may be had through the agency of such an arm 19 so that the bumper may be positioned in the correct position as to elevation; also so as to permit the bar 19 to be extended to the proper position so that the bolt 21 may be passed through the hole provided by the manufacturer of the motor vehicle.

By providing a plurality of bars 19' as illustrated in Fig. 6 which are of different lengths and some of which are offset, a great range of use is obtainable for such a bracket and it is assured that it will not be necessary for the person installing a bumper to bore an unnecessary hole in the frame of the motor vehicle.

Having fully described a preferred embodiment of this invention, it is to be understood that I do not wish to be limited to the exact details of construction herein set forth, which may obviously be varied in detail without departing from the spirit of my invention as set forth in the appended claims.

I claim:

1. A bumper bracket comprising a transverse section having a chamber adapted to receive a pin, a longitudinal arm, an inclined arm, the longitudinal arm having a plurality of apertures, and the inclined arm being apertured at its lower end.

2. A bumper bracket comprising a transverse section having a chamber formed therein, means secured to a bar of a bumper adapted to maintain a pin in the chamber, a longitudinal arm having a plurality of apertures, and an inclined arm apertured at its lower end.

3. A bumper bracket comprising a transverse section having a chamber formed therein, means secured to a bar of a chamber and adapted to pivotally maintain a pin in the chamber, a longitudinal arm formed integral with the transverse member and having a plurality of apertures formed therein, an inclined arm apertured at its lower end and an arm of indefinite length adapted to be adjustably secured to the longitudinal arm at one end and to the frame of a motor vehicle at its opposite end.

4. A bumper bracket comprising a transverse section, a chamber formed in the transverse section, means secured to a bar of a bumper and adapted to maintain a pin in the chamber, the wall of the chamber presenting a shoulder with which the said bumper bar is engaged, and a pair of longitudinally extending arms projecting rearwardly from the said transverse section.

Signed at Los Angeles, Calif., this 30th day of May, 1925.

JAMES S. TORMEY.